United States Patent
Sporzynski et al.

[11] Patent Number: 6,142,267
[45] Date of Patent: *Nov. 7, 2000

[54] DISC BRAKE ROTOR

[75] Inventors: Robert S. Sporzynski, Chelsea; Dean J. Hartford, Wayne, both of Mich.

[73] Assignee: Kelsey-Hayes Company, Romulus, Mich.

[*] Notice: Under 35 U.S.C. 154(b), the term of this patent shall be extended for 1253 days.

[21] Appl. No.: 08/582,034

[22] Filed: Jan. 2, 1996

Related U.S. Application Data

[63] Continuation of application No. 08/389,430, Feb. 14, 1995, abandoned, which is a continuation of application No. 08/125,373, Sep. 21, 1993, abandoned.

[51] Int. Cl.$^7$ .................................................. F16D 65/10
[52] U.S. Cl. ............................. 188/218 XL; 188/264 AA
[58] Field of Search .................... 188/218 XL, 264 AA, 188/264 A; 192/113.2, 113.23, 107 R

[56] References Cited

U.S. PATENT DOCUMENTS

| | | | |
|---|---|---|---|
| 1,717,522 | 6/1929 | Rosenberg | 188/264 A |
| 3,298,476 | 1/1967 | Day . | |
| 3,729,067 | 4/1973 | Buyze . | |
| 3,926,285 | 12/1975 | Preller et al. . | |
| 4,083,435 | 4/1978 | Gallus et al. . | |
| 4,102,438 | 7/1978 | Rancourt . | |
| 4,263,992 | 4/1981 | Moore et al. . | |
| 4,379,501 | 4/1983 | Hagiwara et al. . | |
| 4,448,291 | 5/1984 | Ritsema et al. . | |
| 4,469,203 | 9/1984 | Hebulot et al. | 188/218 XL |
| 4,523,666 | 6/1985 | Murray . | |
| 4,638,891 | 1/1987 | Wirth | 188/218 XL X |
| 4,641,731 | 2/1987 | Kawaguchi et al. . | |
| 4,745,996 | 5/1988 | Wirth . | |
| 4,757,883 | 7/1988 | Thiel et al. . | |
| 4,809,827 | 3/1989 | Suzuki . | |
| 4,819,769 | 4/1989 | Metzler et al. . | |
| 4,825,981 | 5/1989 | Otto et al. . | |
| 4,865,167 | 9/1989 | Giorgetti et al. . | |
| 4,867,284 | 9/1989 | Okamura et al. . | |
| 4,913,266 | 4/1990 | Russell et al. . | |
| 4,928,798 | 5/1990 | Watson et al. . | |
| 5,005,676 | 4/1991 | Gassiat . | |
| 5,107,966 | 4/1992 | Metzler et al. . | |
| 5,109,960 | 5/1992 | Gunther . | |
| 5,137,123 | 8/1992 | Setogawa et al. . | |

FOREIGN PATENT DOCUMENTS

| | | | |
|---|---|---|---|
| 87071 | 8/1983 | European Pat. Off. | 188/218 XL |
| 938421 | 9/1948 | France . | |
| 3908655 | 9/1990 | Germany . | |
| 4331683 | 3/1994 | Germany . | |
| 1325646 | 8/1973 | United Kingdom . | |
| 2057609 | 4/1981 | United Kingdom | 188/218 XL |
| 2211253 | 6/1989 | United Kingdom . | |

*Primary Examiner*—Michael Mar
*Assistant Examiner*—Bradley King
*Attorney, Agent, or Firm*—MacMillan, Sobanski & Todd, LLC

[57] ABSTRACT

An improved vehicle disc brake rotor is disclosed having a unique vented design. The rotor includes a pair of brake friction plates maintained in spaced relationship by a plurality of radially extending fins. Each friction plate is tapered radially from the outer peripheral end to the inner peripheral end thereof such that the friction plates have an increased cross-sectional thickness at the outer end. In addition, each fin is "blended" into the friction plates. Such a configuration increases the heat capacity and stiffness at the outer end of the rotor. A separate radially extending cooling air passageway is defined between each pair of the fins. The air passageway is configured to define a cross-sectional area which is substantially uniform throughout its entire length. This results in the velocity of cooling air being increased as it flows through the passageway, thus improving cooling efficiency.

20 Claims, 3 Drawing Sheets

DISC BRAKE ROTOR

CROSS REFERENCE TO RELATED APPLICATIONS

This application is a continuation of U.S. Ser. No. 08/389,430, filed Feb. 14, 1995, abandoned, which is a continuation of U.S. Ser. No. 08/125,373, filed Sep. 21, 1993, abandoned.

BACKGROUND OF THE INVENTION

This invention relates in general to vehicle brakes and, in particular, to an improved vehicle disc brake rotor.

A conventional hydraulic disc brake assembly includes a brake caliper and a rotor. The brake caliper is secured to an unsprung suspension component of the vehicle, and includes a pair of brake friction pads and a hydraulically actuated piston. The rotor is rotatably supported with an associated wheel relative to the caliper, and includes a mounting flange and an outer annular friction disc. The friction disc defines generally parallel machined inner and outer faces adapted to be frictionally engaged by the friction pads during vehicle braking.

Several important criteria must be considered in designing a rotor for a given brake application. One such criterion is the thermal capacity of the rotor to adequately absorb heat generated during a given vehicle stop. A second, but related criterion is the ability of the rotor (after a given stop) to sufficiently cool to a safe operating temperature for the next vehicle stop or stops. These two criteria are not necessarily mutually exclusive. A solid one piece "unvented" rotor may provide sufficient mass and heat capacity to adequately absorb all the heat generated during a single, hard vehicle stop; however, it may not have sufficient cooling capabilities to adequately handle a series of subsequent hard vehicle stops. Similarly, an unvented rotor with sufficient cooling capabilities may not have sufficient mass to function as an adequate heat sink during a given stop.

While solid unvented rotors exhibit superior heat sink properties, they are generally not equipped to handle a series of hard stops, since their cooling capabilities are limited. In order to dissipate the heat generated during a previous stop, it is known to provide the rotor with a "vented" design.

One example of a vented rotor is shown in U.S. Pat. No. 4,083,435 to Gallus et al. As shown in this patent, the friction disc includes a pair of mutually spaced apart brake friction plates which are connected together by a plurality of radial fins. The fins cooperate to form radially extending air cooling channels to aid in dissipating the heat generated during braking. Other examples of vented rotors are disclosed in U.S. Pat. No. 3,298,476 to Day, U.S. Pat. No. 4,102,438 to Rancourt, U.S. Pat. No. 4,379,501 to Hagiwara et al., U.S. Pat. No. 4,865,167 to Giorgetti et al., U.S. Pat. No. 4,641,731 to Kawaguchi et al., and U.S. Pat. No. 4,757,883 to Thiel et al.

Typically, the brake caliper includes radially extending and axial spaced fingers for supporting the outboard brake pad. The outer radial ends of the fingers are connected by a bridge or center portion. This structure causes the fingers to become less stiff in the radially inwardly direction. As a result of this, the caliper fingers tend to flex during braking, causing the brake pads to apply a greater braking pressure at the outer radial portion of the rotor. Thus, the rotor must be designed such that the outer radial portion thereof is sufficiently stiff or rigid so as to accommodate the associated increased brake forces in this region.

The conventional way to increase the stiffness of the outer radial portion of rotor is by uniformly increasing the thickness of the brake friction plates. However, the thickness of the friction plates is limited by the clearance between the friction pads. Also, increasing the thickness of the friction plates adds additional rotating mass and unsprung weight to the vehicle, and thus adversely affects the performance, handling, and fuel economy of a vehicle. In addition, increasing the thickness of the friction plates unnecessarily stiffens the rotor at the hat portion.

Another way to increase the stiffness of the outer radial portion of the rotor is shown in U.S. Pat. No. 5,161,652 to Suzuki. As shown in this patent, both of the friction plates are directly attached at their inner ends to the hat portion of the rotor.

A further way to increase the stiffness of the outer radial portion of the rotor is shown in German Patent DE 3,908,655. As shown in this patent, the inner surfaces of each of the friction plates is provided with spaced apart reinforcing ridges near the outer radial portions thereof.

SUMMARY OF THE INVENTION

This invention relates to an improved vehicle disc brake rotor wherein the rotor includes a unique vented design. In accordance with one feature of the present invention, each of the brake friction plates is tapered radially from the outer peripheral end to the inner peripheral end thereof such that the friction plates have a cross-sectional thickness defined at the outer peripheral ends which is greater than a cross-sectional thickness defined at the inner peripheral ends. As a result of this, the heat capacity, the conductive area, and the stiffness of the outer radial portion of the rotor are increased.

In accordance with another feature of the present invention, a radially extending cooling air passageway is defined between each pair of the fins. The air passageway defines a first predetermined axial width and a first predetermined longitudinal length near the outer peripheral ends of each of the brake friction plates, and a second predetermined axial width and a second predetermined longitudinal length near the inner peripheral ends of each of the brake friction plates. The first predetermined axial width is less than the second predetermined axial width, and the first predetermined longitudinal length is greater than the second predetermined longitudinal length thereby increasing the lineal flow of cooling air through the passageway. As a result of this, the heat capacity of the rotor is improved, while still maintaining air passageways which achieve sufficient cooling.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
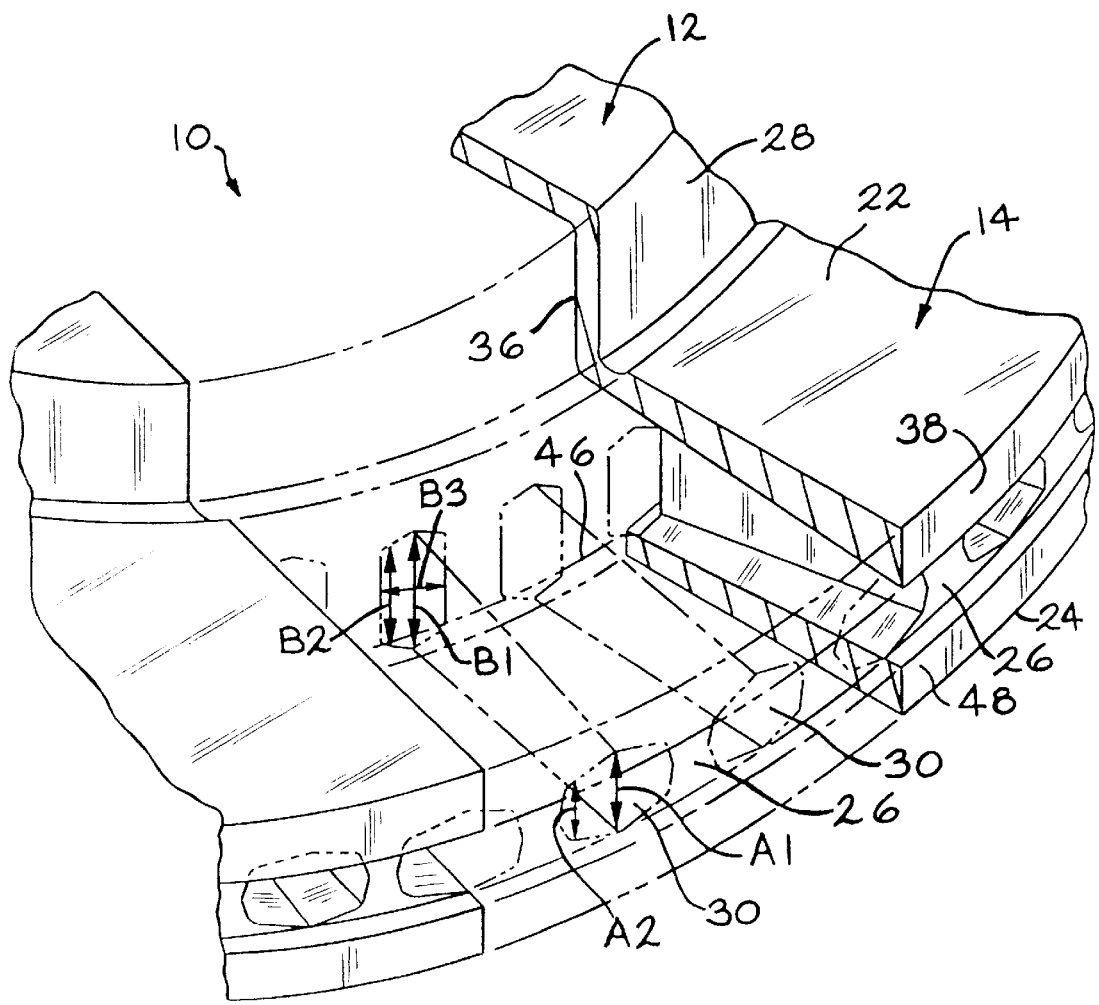
FIG. 1 is a perspective view, partially broken away, of a selected portion of an improved rotor constructed in accordance with the present invention.

Referring now to the drawings, there is illustrated in FIG. 1 a perspective view, partially broken away, of a selected portion of an improved disc brake rotor, indicated generally at 10, which can be used in a disc brake assembly (not shown) such as disclosed in U.S. Pat. No. 4,823,920 to Evans, and herein incorporated by reference. It should be noted that, while the invention is described for use with the particular brake structure shown in this patent, the invention can be used with other disc brake structures.

Figure 4:
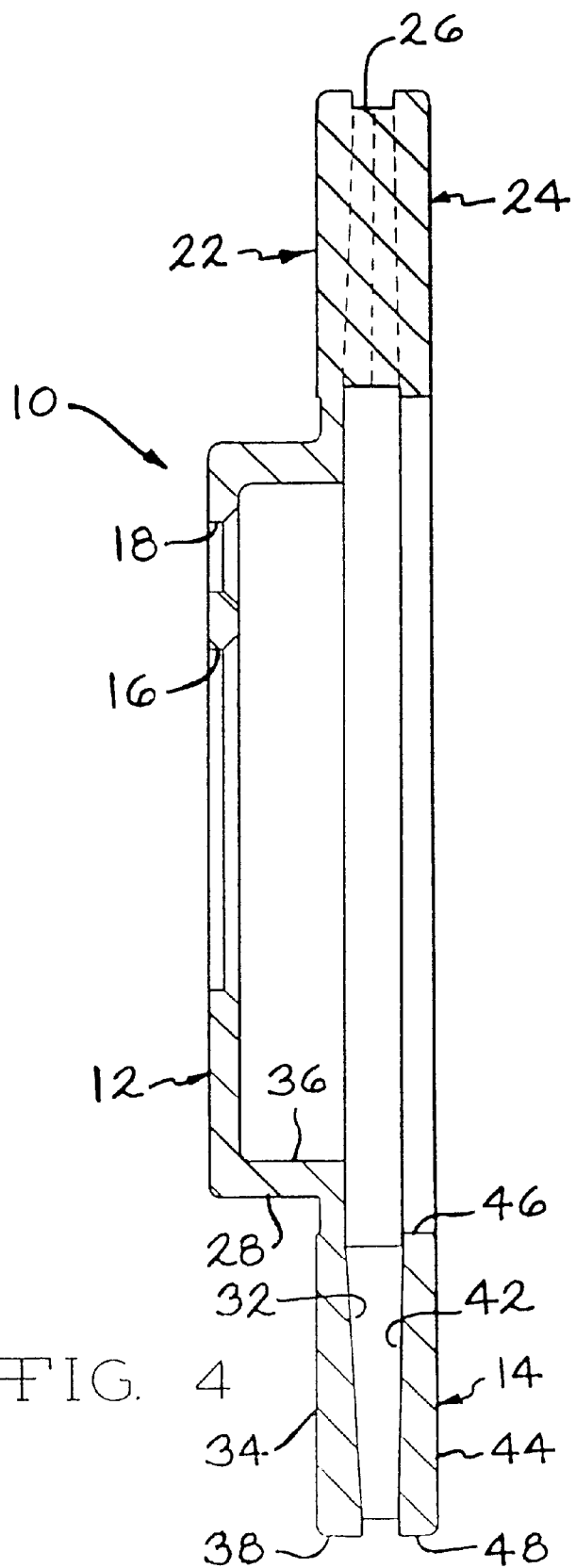
FIG. 4 is a cross sectional view of the rotor.

The rotor 10 shown in this embodiment is formed as a one-piece casting, and comprises a main body including a centrally located mounting flange 12, and an outer annular friction disc 14, best shown in FIG. 4. The mounting flange 12 and friction disc 14 are integrally cast as one-piece during a casting process, and can be formed from either steel, iron or aluminum.

As shown in FIG. 4, the mounting flange 12 includes a centrally located pilot hole 16, and a plurality of lug bolt receiving holes 18 (only one being shown) equally spaced circumferentially about the opening 16. The pilot hole 16 and the lug bolt holes 18 are formed during a subsequent machining operation. A lug bolt (not shown) extends through each of the apertures 18 for mounting and securing a wheel (not shown) thereto. The rotor 10 is secured to a rotatable vehicle component (not shown) in a known manner.

The friction disc 14 includes a pair of annular brake friction plates 22 and 24, which are disposed in mutually spaced apart relationship by a plurality of fins 26. The friction plate 22 is connected via a circumferential wall or hat 28 to the mounting flange 12. Preferably, the fins 26 are equally spaced circumferentially around the friction disc 14, and each successive pair of fins 26 defines a radially extending cooling air passageway 30 between the friction plates 22 and 24.

The friction plate 22 includes an inner facing surface 32, an outer facing surface 34, an inner peripheral end 36, and an outer peripheral end 38. The friction plate 24 includes an inner facing surface 42, an outer facing surface 44, an inner peripheral end 46, and an outer peripheral end 48. The outer facing surfaces 34 and 44 of the plates 22 and 24, respectively, are located in a generally parallel relationship relative to one another.

Figure 2:
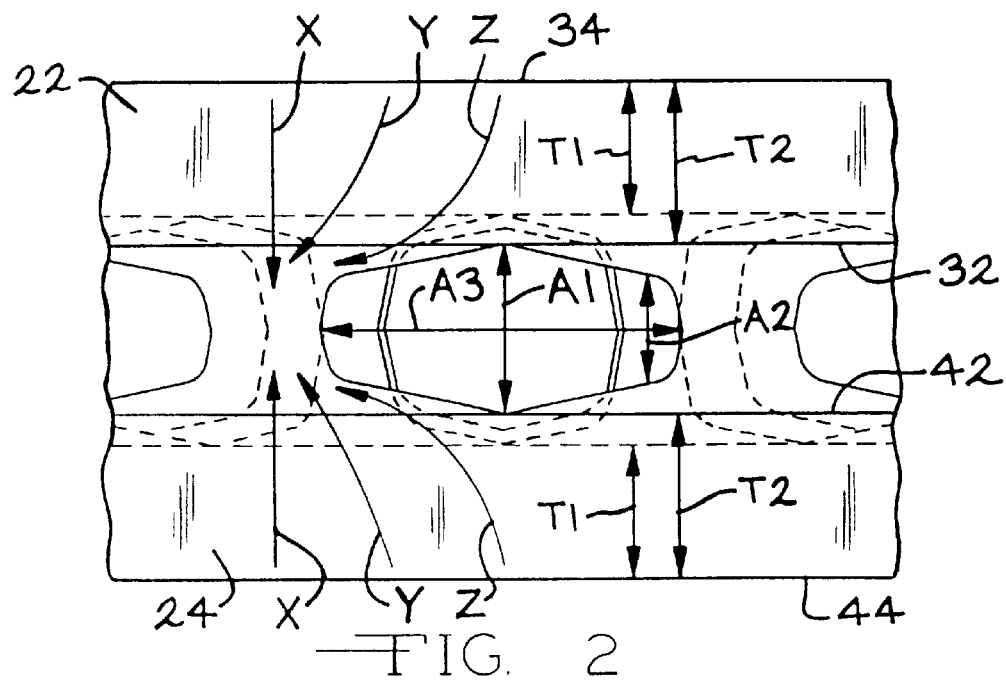
FIG. 2 is a top plan view of the rotor.

As best shown in FIG. 4, the inner facing surface 32 of friction plate 22 is progressively tapered in a radial direction from the outer peripheral portion 38 to the inner peripheral portion 36 thereof. Similarly, the inner facing surface 42 of the friction plate 24 is progressively tapered in a radial direction from the outer peripheral end 48 to the inner peripheral end 46 thereof. As a result of the tapering of the inner facing surfaces 32 and 42 of the friction plates 22 and 24 respectively, the cross-sectional thickness of the friction plates 22 and 24 increases from an original thickness T1 at the inner ends 36 and 46 thereof, to an increased thickness T2 at the outer ends 38 and 48 thereof, as shown in FIG. 2. As will be discussed below, the tapering of the friction plates 22 and 24 has a twofold purpose of increasing both the thermal and mechanical properties of the rotor 10.

Figure 3:
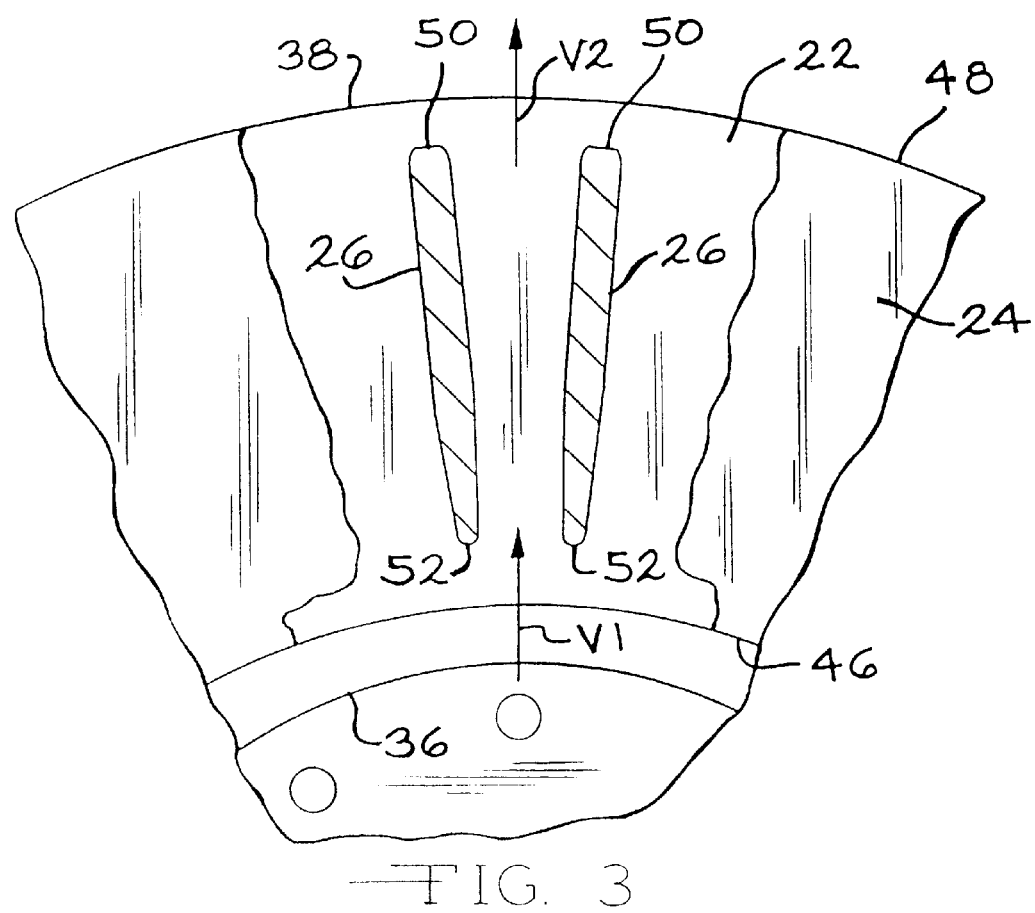
FIG. 3 is a front view, partially broken away, of the rotor.

Turning now to FIGS. 1, 2, and 3, the preferred shape of the fins 26 and the cooling air passageways 30 will be discussed. As shown in this embodiment, each fin 26 extends in a generally radial direction and includes a unique configuration. In particular, each fin 26 includes an outermost end 50 and an innermost end 52. As best shown in FIG. 3, the innermost end 52 of each fin 26 is spaced inwardly from the inner ends 36 and 46 of the friction plates 22 and 24, respectively, and the outermost end 50 of each fin 26 is spaced inwardly from the outer ends 38 and 48 of the friction plates 22 and 24.

Each cooling air passageway 30 includes a unique configuration which is best shown in FIGS. 1 and 2. In particular, near the outer ends 38 and 48 of the friction plates 22 and 24, respectively, each air passageway 30 defines a center or midpoint axial width A1, an end axial width A2 in the area adjacent the fin 26 which is less than A1, and a lengthwise dimension A3 extending between a successive pair of fins.

Also, as a result of the tapering of the plates 22 and 24, each air passageway 30, near the inner ends 36 and 46 of the plates 22 and 24, respectively, defines a midpoint axial width B1 which is greater than the axial width A1 defined near the outer ends 38 and 48 of the plates 22 and 24, respectively. The axial width B1 is greater than an end axial width B2 in the area adjacent the fins 26. In addition, each passageway defines a lengthwise dimension B3 extending between a successive pair of fins near the inner ends 36 and 46 of the plates 22 and 24, respectively, which is less than the length A3 of the passageway 30 defined near the outer ends 38 and 48 of the plates 22 and 24, respectively. As will be discussed below, the unique configuration of the fins 26, and therefore the cooling air passageways 30, improves both the heat distribution and cooling capability of the rotor 10 during braking.

One advantage of the present invention is that the tapering of the friction plates 22 and 24 adds additional mass at the outer radial portions of the friction plates thereby increasing the stiffness of the rotor at this region. This reduces the tendency of the rotor to flex during braking, thereby reducing the possibility of brake shudder during braking. Also, increasing the stiffness of the rotor reduces the tendency to form undulations in the outer surfaces of the brake friction plates during machining. This enables tighter tolerances to be maintained between the outer surfaces of the brake friction plates after finish machining of the rotor.

Another advantage of the tapering of the friction plates 22 and 24 is that the additional mass acts as a heat sink to increase the heat capacity of the rotor. A further advantage of the tapering of the friction plates 22 and 24 is that the additional mass increases the cross-sectional area of the plates 22 and 24 to improve the heat conduction to the fins 26 of the rotor 10. Accordingly, the tapering of the friction plates 22 and 24 advantageously increases both the mechanical and thermal properties of the rotor. Also, the tapering of the brake friction plates 22 and 24 provides a larger area for flow of the molten rotor casting material from the outer diameter to the inner diameter of the rotor to improve the castability of the rotor.

Another advantage of the present invention results from the shape of the the fins 26, and therefore, the air cooling passageways 30. Due to the unique shape of the passageways 30, the lineal velocity of the flow of cooling air from an air inlet V1 to an air outlet V2 of the rotor 10, shown in FIG. 3, is increased without restricting or choking the flow of the air supplied to the air inlet Vl of the passageway 30.

Also, since the center axial widths A1 and B1 of each passageway 30 is greater than the end axial widths A2 and B2 thereof, the fins 26 tend to gradually blend into the brake friction plates 22 and 24. This blending is especially advantageous at the outer portions of the rotor where the greatest amount of heat is generated during braking, since it prevents choking and more evenly conducts heat to the cooling fins. During braking, the heat from the outer surfaces of the brake friction plates travels inwardly and toward the center of each fin 26, as shown by heat path lines X, Y, and Z in FIG. 2. Thus, the heat from path line Z has to travel the farthest to reach the center of a fin 26. Also, the heat from path line Z travels the least direct path compared to the heat from path lines X and Y. Thus, by blending the fins 26 with the plates 22 and 24, the transfer of heat flow along path line Z occurs in a relatively smooth manner thereby increasing the heat dissipating capacity of the rotor 10.

Also, because the unique configuration of the rotor of the present invention has improved heat and cooling capabilities compared to prior art rotors, the maximum surface temperature of the rotor is less than the maximum surface temperature of a prior art rotor. As a result of this, less wear of the brake friction plates and brake pads occurs. In addition, reducing the surface temperature tends to keep the machined surfaces of the rotor smoother for longer periods of use which in turn reduces noise during braking which normally occurs as the surfaces roughen. In addition, reducing the surface temperature minimizes the possibility of fluid boil during braking, which can be a problem on vehicles descending steep downgrades.

A further advantage of the present invention is that the unique configuration of the rotor reduces the "coning" of the rotor during braking. Coning is defined as the deflection of the annular friction disc during braking. Yet a further advantage of the present invention is that the unique configuration of the rotor provides a more even temperature distribution in the brake friction plates, especially in the outer surfaces of the plates. As a result of this, friction characteristics are improved and there is less tendency for brake fade.

While the rotor of the present invention has been illustrated and described as tapering the inner surfaces of the brake friction plates as shown in the drawings, the tapering of the plate inner surfaces can be accomplished in other ways so long as a smooth transition is provided from the inner portion to the outer portion of the plate. For example, the inner surfaces of the brake friction plates can be curved inwardly, i.e., generally concave-shaped (not shown). Also, the particular shape, spacing, and number of fins 26 and air passageways 30 can be varied depending upon various design considerations, such as for example, the size and kind of the rotor. It is generally preferrred, however, to form the passageways with a substantially uniform cross-sectional area throughout their entire radial length. This results in the lineal velocity of cooling air being increased as it flows outwardly through the associated passageway.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed:

1. A brake rotor comprising:
    an annular mounting flange; and
    an annular friction disc extending from said mounting flange and having a passageway formed therethrough extending from a radially inner end to a radially outer end, said radially outer end of said passageway defining a first center axially extending dimension, a first end axially extending dimension which is smaller than said first center axially extending dimension, and a first circumferentially extending dimension, said radially inner end of said passageway defining a second center axially extending dimension which is greater than said first center axially extending dimension, a second end axially extending dimension which is smaller than said second center axially extending dimension, and a second circumferentially extending dimension which is smaller than said first circumferentially extending dimension, said passageway defining a generally straight side wall surface between said first center axially extending dimension and said first end axially extending dimension and between said second center axially extending dimension and said second end axially extending dimension.

2. The brake rotor defined in claim 1 wherein said first end axially extending dimension is smaller than said second end axially extending dimension.

3. The brake rotor defined in claim 1 wherein said passageway defines a generally uniform cross-sectional area throughout its entire radial length.

4. The brake rotor defined in claim 1 wherein said friction disc includes a plurality of passageways formed therethrough.

5. The brake rotor defined in claim 4 wherein said friction disc includes a pair of spaced apart brake friction plates, each of said brake friction plates including inner surfaces which are tapered radially inwardly from a radially outer end to a radially inner end thereof to define a cross-sectional thickness at said radially outer ends which is greater than a cross-sectional thickness defined at said radially inner ends.

6. The brake rotor defined in claim 5 wherein said tapered inner surfaces extend uninterrupted from said radially outer ends to said radially inner ends.

7. The brake rotor defined in claim 5 further including a plurality of radially extending fins disposed between and connected to said inner surfaces of said brake friction plates.

8. A brake rotor comprising:
    an annular mounting flange;
    a pair of spaced apart brake friction plates, each of said brake friction plates including inner surfaces which are tapered radially inwardly from a radially outer end to a radially inner end thereof to define a cross-sectional thickness at said radially outer ends which is greater than a cross-sectional thickness defined at said radially inner ends, said tapered inner surfaces extend uninterrupted from said radially outer ends to said radially inner ends;
    a plurality of radially extending fins disposed between and connected to said inner surfaces of said brake friction plates; and
    an annular friction disc extending from said mounting flange and having a plurality of passageways formed therethrough extending from a radially inner end to a radially outer end, said passageways defining a generally uniform cross-sectional area throughout their entire radial length, said radially outer end of each of said passageways defining a first center axially extending dimension, a first end axially extending dimension which is smaller than said first center axially extending dimension, and a first circumferentially extending dimension, said radially inner end of each of said passageways defining a second center axially extending dimension which is greater than said first center axially extending dimension, a second end axially extending dimension which is smaller than said second center axially extending dimension and greater than said first end axially extending dimension, and a second circumferentially extending dimension which is smaller than said first circumferentially extending dimension, said passageway defining a generally straight side wall surface between said first center axially extending dimension and said first end axially extending dimension and between said second center axially extending dimension and said second end axially extending dimension.

9. A brake rotor comprising:

an annular mounting flange; and an annular friction disc extending from said mounting flange and having a plurality of passageways formed therethrough extending from a radially inner end to a radially outer end, each of said passageways being of a generally octagonal shape and including a first side wall, a second side wall, a third side wall, a fourth side wall, a fifth side wall, a sixth side wall, a seventh side wall, and an eighth side wall, said first and second side walls being directly adjacent one another, said second and third side walls being directly adjacent one another, said third and fourth side walls being directly adjacent one another, said fourth and fifth side walls being directly adjacent one another, said fifth and sixth side walls being directly adjacent one another, said sixth and seventh side walls being directly adjacent one another, said seventh and eighth side walls being directly adjacent one another, and said eighth and first side walls being directly adjacent one another, at least said first, fourth, fifth, and eighth side walls are straight side walls, said friction disc further including a pair of spaced apart brake friction plates, each of said brake friction plates including inner surfaces which are tapered radially inwardly from a radially outer end to a radially inner end thereof to define a cross-sectional thickness at said radially outer ends which is greater than a cross-sectional thickness defined at said radially inner ends.

10. The brake rotor defined in claim 9 wherein a transition wall from said first side wall to said second side wall defines a generally curved transition wall, a transition wall from said third side wall to said fourth side wall defines a generally curved transition wall transition; a transition wall from said fifth side wall to said sixth side wall defines a generally curved transition wall, and a transition wall from said seventh side wall to said eighth side wall defines a generally curved wall transition.

11. The brake rotor defined in claim 9 wherein said second, third, sixth, and seventh side walls are straight side walls.

12. The brake rotor defined in claim 9 wherein said passageway defines a generally uniform cross-sectional area throughout its entire radial length.

13. The brake rotor defined in claim 9 wherein said tapered inner surfaces extend uninterrupted from said radially outer ends to said radially inner ends.

14. The brake rotor defined in claim 9 further including a plurality of radially extending fins disposed between and connected to said inner surfaces of said brake friction plates.

15. A brake rotor comprising:

an annular mounting flange; and an annular friction disc extending from said mounting flange and having a passageway formed therethrough extending from a radially inner end to a radially outer end, said passageway being of a generally octagonal shape and including a first side wall, a second side wall, a third side wall, a fourth side wall, a fifth side wall, a sixth side wall, a seventh side wall, and an eighth side wall, said first and second side walls being directly adjacent one another, said second and third side walls being directly adjacent one another, said third and fourth side walls being directly adjacent one another, said fourth and fifth side walls being directly adjacent one another, said fifth and sixth side walls being directly adjacent one another, said sixth and seventh side walls being directly adjacent one another, said seventh and eighth side walls being directly adjacent one another, said first, fourth, fifth and eighth side walls defining a first side wall dimension, and said second, third, sixth and seventh side walls defining a second side wall dimension which is less than said first side wall dimension.

16. The brake rotor defined in claim 15 wherein said radially outer end of said passageway defines a first center axially extending dimension, a first end axially extending dimension which is smaller than said first center axially extending dimension, and a first circumferentially extending dimension, said radially inner end of said passageway defining a second center axially extending dimension which is greater than said first center axially extending dimension, a second end axially extending dimension which is smaller than said second center axially extending dimension, and a second circumferentially extending dimension which is smaller than said first circumferentially extending dimension.

17. The brake rotor defined in claim 15 wherein at least said first, fourth, fifth, and eighth side walls are straight side walls.

18. The brake rotor defined in claim 15 wherein a transition wall from said first side wall to said second side wall defines a generally curved transition wall, a transition wall from said third side wall to said fourth side wall defines a generally curved transition wall transition; a transition wall from said fifth side wall to said sixth side wall defines a generally curved transition wall, and a transition wall from said seventh side wall to said eighth side wall defines a generally curved wall transition.

19. The brake rotor defined in claim 18 wherein said second, third, sixth, and seventh side walls are straight side walls.

20. A brake rotor comprising:

an annular mounting flange; and an annular friction disc extending from said mounting flange and having a passageway formed therethrough extending from a radially inner end to a radially outer end, said radially outer end of said passageway defining a first center axially extending dimension, a pair of opposed first end axially extending dimensions which are generally equal to one another and smaller than said first center axially extending dimension, and a first circumferentially extending dimension defined between opposed first circumferential outermost ends of said passageway at said radially outer end thereof, said radially inner end of said passageway defining a second center axially extending dimension which is greater than said first center axially extending dimension, a pair of opposed second end axially extending dimensions which are generally equal to one another and smaller than said second center axially extending dimension, and a second circumferentially extending dimension defined between opposed second circumferential outermost ends of said passageway at said radially inner end thereof and which is smaller than said first circumferentially extending dimension, said opposed first end axially extending dimensions being located adjacent to but not at said opposed first circumferential outermost ends of said passageway, said opposed second end axially extending dimensions being located adjacent to but not at said opposed second circumferential outermost ends of said passageway, and said passageway having four side walls extending between said first and second center axially extending dimensions and said first and second end axially extending dimensions, wherein said four side walls are generally straight side walls.

* * * * *